United States Patent [19]

Baker et al.

[11] Patent Number: 4,631,209

[45] Date of Patent: Dec. 23, 1986

[54] MANUFACTURE OF ASBESTOS-FREE FRICTION FACING MATERIAL

[75] Inventors: Ralph Baker, Buxton; Eric T. Smith, New Mills; Vaughan T. Dickinson, Whitworth; Noel C. McKenzie, Rochdale; Brian Hargreaves, Flixton, all of England

[73] Assignees: Ferodo Ltd.; T&N Research Ltd., both of Manchester, England

[21] Appl. No.: 763,782

[22] Filed: Aug. 8, 1985

[30] Foreign Application Priority Data

Aug. 30, 1984 [GB] United Kingdom ............... 8421915

[51] Int. Cl.$^4$ .............................................. B05D 3/02
[52] U.S. Cl. ................................... 427/392; 156/62.2; 427/389.9
[58] Field of Search ................... 156/62.2; 427/389.9, 427/392; 428/283, 326, 327, 527, 529

[56] References Cited

U.S. PATENT DOCUMENTS

| | | |
|---|---|---|
| 4,061,823 | 12/1977 | McCaskey, Jr. et al. ....... 428/326 X |
| 4,086,125 | 4/1978 | Vasishth et al. ................. 156/62.2 |
| 4,173,681 | 11/1979 | Durrieu et al. ..................... 428/409 |
| 4,320,823 | 3/1982 | Covaleski ........................ 428/326 X |
| 4,514,532 | 4/1985 | Hsu et al. ......................... 428/529 X |
| 4,537,823 | 8/1985 | Tsang et al. ...................... 428/308.4 |
| 4,548,678 | 10/1985 | Laflin et al. ......................... 162/146 |
| 4,562,218 | 12/1985 | Fornadel et al. ..................... 428/529 |

FOREIGN PATENT DOCUMENTS 0000840 8/1978 United Kingdom .
0129022 4/1984 United Kingdom .

OTHER PUBLICATIONS

"Friction in Oil a Paradox Considered", *Ferodo International Technical News F45* Nov. 1977, pp. 15-16.

*Primary Examiner*—Thurman K. Page
*Attorney, Agent, or Firm*—Nixon & Vanderhye

[57] ABSTRACT

In a method of making asbestos-free friction facing material in the form of a water-laid sheet of cellulosic fibres, in which are distributed friction-imparting particles and particles of friction-modifier, the sheet containing a thermosetting phenolic resin which after curing binds the ingredients firmly together, the thermosetting phenolic resin is included in emulsified form in the aqueous suspension of ingredients from which the water-laid sheet is prepared.

This leads to a product of more consistent friction performance than is obtained by post-sheeting impregnation with thermosetting phenolic resin.

2 Claims, No Drawings

MANUFACTURE OF ASBESTOS-FREE FRICTION FACING MATERIAL

This invention relates to the manufacture of asbestos-free friction facing material for bonding to metal backing for use in brakes, clutches and the like operating in a medium of oil.

A known form of such asbestos-free facing is prepared by sheeting out material by conventional paper-making techniques from an aqueous suspension comprising cellulose fibres, particularly cotton; relatively hard inorganic particles, such as particles of diatomite, to provide friction; and particles of friction-modifer such as cardolite (the reaction product of cashew nut shell liquid and formaldehyde) to reduce the rate of wear in the final facing. The porous sheet thus obtained is then impregnated with an organic solvent solution of a thermosetting phenolic resin, and after draining from excess impregnant, the sheet is heated to evaporate the solvent. For use, the dry resin-impregnated sheet is laid on a layer of adhesive applied to the metal backing which the sheet is to face, and the assembly is heated under pressure; and during this operation the resin becomes cured and so binds the sheet ingredients firmly together, enabling integrity to be maintained in use, and the sheet (which remains porous) becomes securely bonded to the backing.

We have observed differences in friction performance between facings prepared from identical ingredients under apparently identical conditions; and in the course of investigating the reasons for these differences, we have found that they are related to unexpected variations in concentration of cured impregnating resin across the thickness (which is of the order of 1 mm) of the sheet. These variations, which we have not observed with asbestos-containing friction facings, appear in turn to be associated with variations in the rate at which the solvent for the uncured resin is evaporated from the sheet. Since it is difficult to control the rate of solvent evaporation, we have concluded that the step of evaporating solvent is, with this kind of product, something that should be avoided as far as possible.

According to the present invention, the thermosetting phenolic resin which is to undergo curing and bind the sheet ingredients together in the final facing is included in emulsified form in the aqueous suspension of cellulosic fibres, friction-imparting particles and particles of friction-modifier that is submitted to the paper-making operation. In this way a product of more consistent performance can be obtained.

The invention is illustrated by the following example:

EXAMPLE

This example illustrates the preparation of friction facing material suitable for use on brakes for agricultural tractors. The following ingredients are employed:

|  | Dry weight, % |
|---|---|
| Refined cellulose pulp | 27.2 |
| Cotton linters (second cut) | 9.0 |
| Cardolite | 11.8 |
| Diatomite | 21.0 |
| Phenol-formaldehyde resin | 31.0 |

A. Preparation of Stock (i) Bleached softwood sulphate pulp in sheet form was made into an aqueous slurry of solids content about 3 percent by weight and treated in a disc refiner until its freeness was 50° Schopper Riegler.

(ii) A sheet of cotton linters was made into an aqueous slurry of solids content about 3 percent by weight and agitated vigorously for two hours.

(iii) The cardolite (98% passing a 150 $\mu$m sieve) and diatomite (Hyflo Super-Cel; median particle size 18 $\mu$m) were added to 100 liters of cold water in a mixing tank and agitated vigorously for a few minutes.

(iv) The pulp of (i) [2.96 kg dry weight=98.7 kg wet weight] was added to the mixing tank together with the slurry of cotton linters [0.98 kg dry weight=32.7 kg wet weight] and agitated.

(v) A thermosetting phenolic resin in emulsified form was prepared by heating phenol (1 mol), a 40 percent aqueous solution of formaldehyde (1.3 mols HCHO), ammonia (3 percent by weight $NH_3$ on weight of phenol employed) and emulsifying agent to obtain an emulsion of 50 percent solids content. Such a resin is available from Ferodo Ltd under the designation R1777. This (6.75 kg wet weight) was diluted with water (30 liters and the diluted emulsion was passed through a strainer to the mixing tank, the contents of which were agitated for a few minutes.

(vi) Borax ($Na_2B_4O_7 10H_2O$; 135 grms) in 250 mls of water at 55° C. was added to the mixing tank with further agitation.

(vii) 2.5 liters of a 1 percent aqueous solution of the anionic polyelectrolyte sold under the name Percol E24 were added to the mixing tank with agitation.

(viii) A 10 percent aqueous solution of papermakers' alum was added to the mixing tank to reduce the pH to the range 4.0–4.6.

(ix) A 5 percent solution of sodium hydroxide was added to the mixing tank to raise the pH to the range 7.5–8.0.

The slurry thus obtained was diluted with cold water to bring the solids content to about 2 percent by weight.

B. Preparation of Facing Material

The stock (slurry) of A above was made into paper form in an entirely conventional way on a Fourdrinier flat wire paper machine, such as is described in chapters 10 and 11 of 'Paper and Board Manufacture' by Julius Grant, James H Young, and Barry G Watson (Publishers: Technical Division, the British Paper and Board Industry Federation, London, 1978). The slurry is progressively dewatered as it travels on the water-permeable conveyor of the machine, and the dewatered material is consolidated by pressing between rollers, and then dried to low moisture content (suitably 2% by weight). The properties of the facing material thus obtained were:

| Thickness | 1.85 mm |
|---|---|
| Density | 400 kg/m$^3$ |
| Mass per unit area | 745 g/m$^2$ |
| Tensile strength | |
| in machine direction | 2.7 Mpa |
| across machine | 2.0 Mpa |
| Loss on heating (10 mins at 130° C.) | 5.2% |

We claim:
1. In a method of making asbestos-free friction facing material suitable for operation in oil, in the form of a fibrous sheet whose fibers consist essentially of cellu- losic fibers and which contains friction-imparting particles and particles of friction modifier, the sheet containing a thermosetting phenolic resin which after curing binds the ingredients firmly together, said method comprising preparing a water-laid sheet by a paper-making process from an aqueous suspension of cellulosic fibers and other sheet forming ingredients, the improvement comprising in (1) employing as the cullulosic fibers a mixture of cotton fibers and refined cellulose pulp, and (2) including the thermosetting phenolic resin in emulsified from in the aqueous suspension from which the sheet is laid.

2. A method according to claim 1, in which the friction imparting particles are of diatomite.

* * * * *